United States Patent

[11] 3,623,525

[72] Inventor Raymond Kieves
 1507 Inkster Blvd., Winnipeg, Canada
[21] Appl. No. 36,967
[22] Filed May 13, 1970
[45] Patented Nov. 30, 1971

[54] ADJUSTABLE RADIALLY ARRANGED FOOD-SLICING ASSEMBLY
 6 Claims, 4 Drawing Figs.
[52] U.S. Cl. .................................................. 146/124,
 146/113 R
[51] Int. Cl. .................................................... B26d 4/22,
 B26d 4/48
[50] Field of Search .......................................... 146/124,
 113 R, 113 A, 113 B, 113 C, 113 D, 113 E, 114, 115

[56] References Cited
UNITED STATES PATENTS
652,740 7/1900 Beck ........................... 146/124
FOREIGN PATENTS
74,471 4/1894 Germany ....................... 146/124

Primary Examiner—Willie G. Abercrombie
Attorney—Otto John Munz

ABSTRACT: A food-slicing assembly comprising a rotary circular disk having a plurality of pivotally mounted cutting blades positioned in radially arranged elongated slots on the disk. A concentrically mounted sleeve having a series of inclined surfaces provides adjustment of the acute angle of the blades with respect to the plane of the disk for the purpose of varying the thickness of the food slices which are produced by slicing a food mass pressed against the disk.

PATENTED NOV 30 1971          3,623,525
FIG. 1
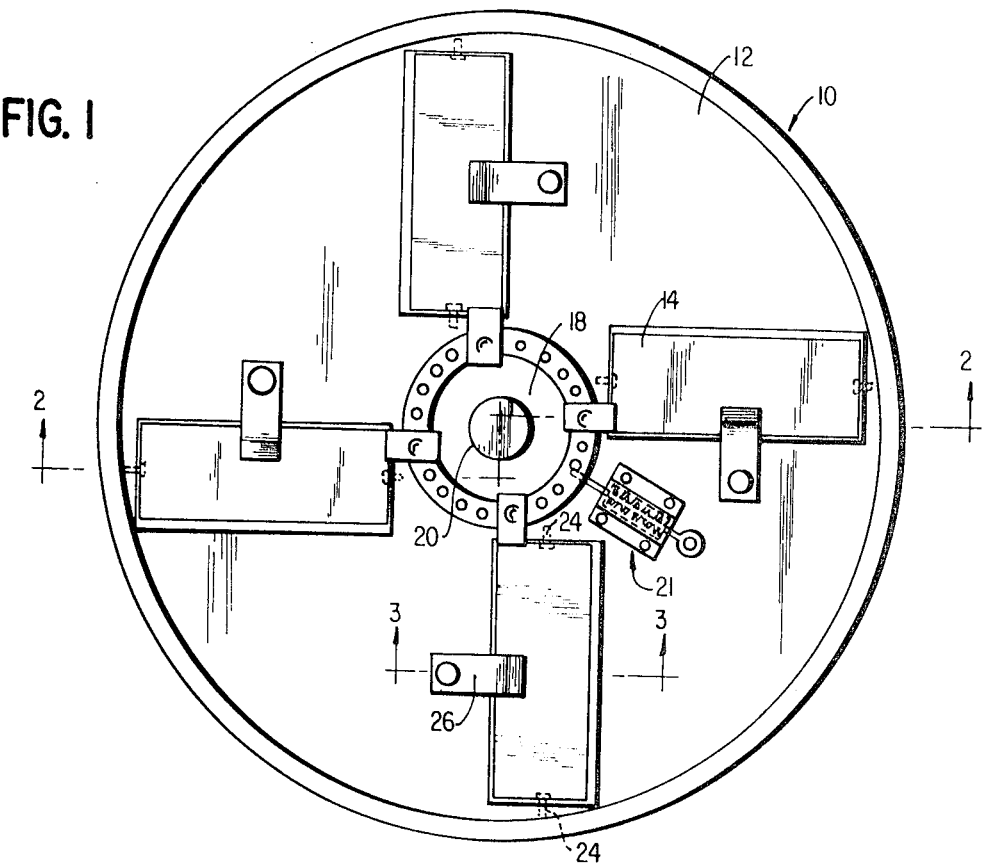
FIG. 2
FIG. 3
FIG. 4
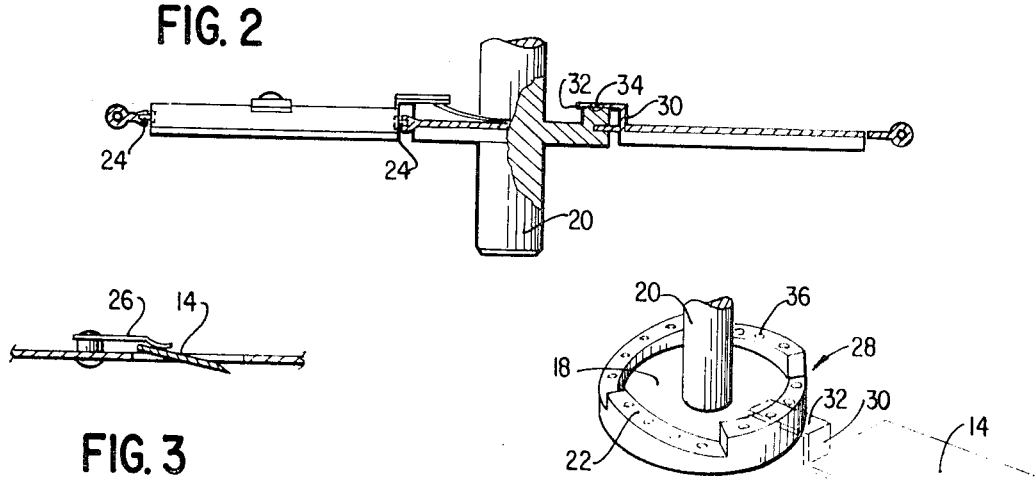
INVENTOR
RAYMOND KIEVES
BY *[signature]*
ATTORNEY 3,623,525

ADJUSTABLE RADIALLY ARRANGED FOOD-SLICING ASSEMBLY

BACKGROUND OF THE INVENTION

1. Field of the Invention extensions horizontal

The present invention relates generally to a food-slicing assembly and more particularly is directed to an assembly which is capable of varying the thickness of the slices of food products, such as fruits and vegetables.

2. Object of the Invention

One of the principal objects of the invention is to provide a good slicing assembly for the above purpose which comprises, among other things, a rotatably mounted circular disk having a plurality of radially arranged cutting blades which are capable of relative adjustment with respect to the disk for the purpose of varying the thickness of the slices which are produced by slicing the food mass pressed against the disk. More specifically, the food slicing assembly is organized so that the plurality of cutting blades may be easily manipulated in a manner whereby to obtain food slices having different cross-sectional dimensions or configurations.

A specific object of the invention is to provide a circular disk which is constructed of a plastic material and cutting blades which are constructed of a metallic material.

A further specific object of the invention is to provide cutting edges of the blades which are constructed of a metallic material embedded in a plastic material.

A still further object of the invention is the provision of such a food slicing assembly which is sturdy and durable in construction, reliable and efficient in operation, reasonable in cost to manufacture easy to use and efficient in carrying out the purposes for which it is designed.

Further objects, features and advantages of the invention pertain to the particular arrangement and structure whereby the above-mentioned aspects of the invention are attained. The invention will be better understood by reference to the following description and to the drawing forming a part thereof.

BRIEF DESCRIPTION OF THE DRAWING

FIG. 1 is a top plan view of an exemplary embodiment of a food slicing assembly in accordance with the present invention;

FIG. 2 is a cross-sectional view taken along the plane 2—2 of FIG. 1; FIG. 3 is a cross-sectional view taken along the plane 3—3 of FIG. 1;

FIG. 4 is a plane view of the inclined surfaces of the sleeve with indentations thereon to receive the beads of the blade extension.

DESCRIPTION OF THE PREFERRED EMBODIMENT

There is shown in FIGS. 1 through 4 a food-slicing assembly 10 in accordance with the present invention. Briefly, the embodiment described herein comprises a rotary circular disk 12 having a plurality of pivotally mounted cutting blades 14 positioned in radially arranged elongated slots 16 on the disk 12. A sleeve 18 concentrically mounted with respect to an inner rotating shaft 20 and to the outer disk 12 has a series of inclined surfaces 22 thereon to provide adjustment of the angle of the pivoted blades 14 for the purpose of varying the thickness of the food slices which are produced by slicing a food mass pressed against the disk 12. Thus, the radially extending cutting blades 14 placed in their adjusted angular positions around the disk area and having their cutting edges protruding above the surface of the disk 12 are capable of cutting, shredding or peeling food when the food is held in contact with the blades 14 and the disk 12 is rotated by suitable manual or motor means.

Considering in detail the slicing assembly 10 includes a conventional type cylindrical housing (not shown) which may be made of metal or of plastic materials. Such a housing normally has a circular bottom and an open top and would be divided by the circular disk or plate 12 as illustrated in FIGS. 1 and 2 into an upper cutting or shearing compartment and a lower receiving compartment.

The circular disk 12 is formed of a plastic material and is provided with the plurality of elongated radially extending slots 16 which are substantially pitched from each other by equal angles. The elongated blade or knife 14 is positioned within each of the slots 16 at an acute angle with respect to the plane of the disk 12. Substantially all of the slice cuttings of the food freely fall through the slots 16 into the lower receiving compartment.

Referring to FIGS. 1 and 2, it may be seen that the individual blade 14 is pivotally mounted on the end walls of the slots 16 of the disk 12 by bolts or rivets 24. Further, each blade 14 is firmly held in the desired angular position by an elongated shaped spring clip 26 which is suitably fastened by rivets or the like to disk 12. The clip 26 presses downwardly on blade 14 about midpoint thereof. However, more clips could be utilized in other locations and this would be within the spirit of the present invention.

The circular disk 12 is constructed of a plastic material and the blades 14 may be constructed entirely of a metallic material and such edges may be embedded in a plastic material.

Referring to FIG. 4, an extension or flange 28 in integrally formed on a corner of the inner end of each of the blades 14. Each of the extensions 28 has a vertical portion 30 and a horizontal portion 32. A depending bead 34 is constructed on the horizontal portion 32 and is adapted to fit or snap securely into a recess or indentation 36 located on the inclined surface 22 of the sleeve 18. The extensions 28 form the support for the blades 14 as well as the attached disk 12.

The sleeve 18 is a cylindrical shaped bearing member that is concentrically mounted on the rotatable shaft 20. As shown in FIG. 4, the sleeve 18 has a top surface thereof near its outer periphery, on which four surfaces 22, which are sloped or inclined with respect to the horizontal plane of disk 12, are constructed. Each inclined surface 22 has four indentations 36 wherein the bead 34 of extension 28 may be selectively inserted. Thereby blades 14 may be positioned at any one of the four angular positions with respect to the horizontal plane of the disk 12. It is obvious that various arrangements of more or less inclined surfaces and indentations could be employed to provide other types of angular adjustments of the blades.

The sleeve 18 includes a suitable means to lock the sleeve in various radial positions on the shaft 20, thereby achieving the required indexing or setting of the indentations 36 of sleeve 18 with respect to the beads 34 of blades 14. For example, to change the setting of the sleeve 18 as shown in FIG. 4, to another setting, the extensions 28 would be slightly raised above the inclined surface 22 and the sleeve 18 would then be rotated a partial turn to another desired setting. Simultaneously, the beads 34 of the extensions 28 would be inserted in the new desired indentation position and the sleeve 18 securely locked to shaft 20. Thus, the shaft 20 would rotate the sleeve and attaching blades and disk.

The shaft 20 may be driven either by a motor means or a manual crank mechanism, both of which are well known in the art.

It may be seen that there has been described herein an improved food slicing assembly having numerous advantages in both its structure and operation. The apparatus described herein is presently considered to be preferred; however, it is contemplated that further variations and modifications within the purview of those skilled in the art can be made herein. The following claims are intended to cover all such variations and modifications as fall within the true spirit and scope of the invention.

I claim:

1. A slicing assembly comprising:
   a shaft member;
   a sleeve member rotatably mounted on said shaft member and provided with a plurality of spaced elements at various elevations;

a circular disk member concentrically positioned with respect to said sleeve and shaft members and provided with a plurality of radially arranged elongated slots;

individual elongated blade members positioned within each of said slots and pivotally mounted on said disk member;

the cutting edge of each of said blade members protruding beyond the plane of the disk member and at an angle thereto;

said blade members having extensions means thereon for cooperating with said spaced elements of said sleeve member whereby various angular positions of the blade members may be selectively made for the purpose of varying the thickness of the food slices which are produced by slicing the food mass pressed against the disk member.

2. A slicing assembly as defined in claim 1, wherein said extension means of said blade members having depending beads thereon and said spaced elements of said sleeve member are indentations, each of said depending beads being selectively received in an indentation for forming a tight and secure joint.

3. A slicing assembly as defined in claim 2, wherein said sleeve member includes a plurality of surfaces having said spaced indentations thereon and said surfaces are inclined with respect to the plane of said circular disk.

4. A slicing assembly as defined in claim 1, wherein said sleeve member includes means to selectively rotate and to securely lock said sleeve member at various positions on said shaft member whereby the desired adjustment of said blade member is achieved.

5. A slicing assembly as defined in claim 1, wherein said disk member is formed of a plastic material and said blade members are formed of a metallic material.

6. A slicing assembly as defined in claim 1, wherein said disk member is formed of a plastic material and said cutting edges of said blade members are formed of metallic material embedded in plastic material.

* * * * *